A. DE VILBISS, Jr.
SCALE.
APPLICATION FILED APR. 24, 1905.
948,991.
Patented Feb. 15, 1910.
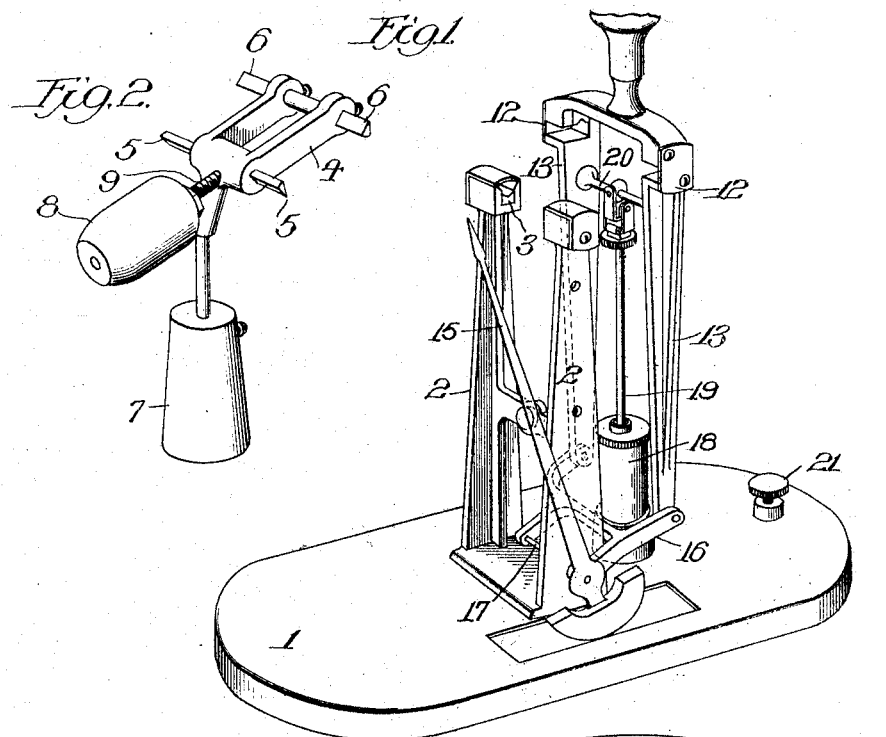
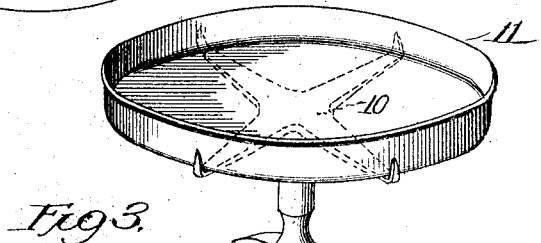
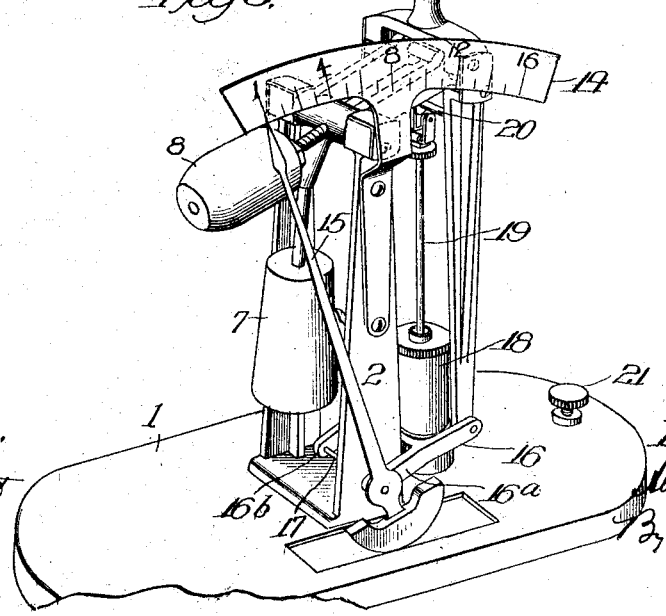

UNITED STATES PATENT OFFICE.

ALLEN DE VILBISS, JR., OF TOLEDO, OHIO, ASSIGNOR TO TOLEDO COMPUTING SCALE COMPANY, OF TOLEDO, OHIO, A CORPORATION OF NEW JERSEY.

SCALE.

948,991.

Specification of Letters Patent.  Patented Feb. 15, 1910.

Application filed April 24, 1905. Serial No. 257,199.

*To all whom it may concern:*

Be it known that I, ALLEN DE VILBISS, Jr., a citizen of the United States, residing at Toledo, in the county of Lucas and State of Ohio, have invented certain new and useful Improvements in Scales, of which the following is a specification.

My invention relates to scales and more particularly to that type or character thereof known as postal scales for the weighing of mail or postal matter, and the object of my invention is to produce an efficient, reliable and compact scale of this character.

The various advantages and points of utility of my form and construction of scale will be apparent from the description hereinafter given.

Figure 1 is a perspective view of my postal scale with a portion thereof removed and illustrated in the perspective view, Fig. 2; Fig. 3 a perspective of my scale completely assembled and ready for use.

According to the present embodiment of my invention, as illustrated in the drawing, the scale comprises a base or suitable support such as the flat plate 1, from which rise two parallel standards or supports 2, whose free upper ends are provided with suitable bearings 3. These bearings support the main lever 4 of the scale, provided with knife edge bearings 5 arranged to rest in the bearings 3 at the upper ends of the standards 2, as described. In the present instance, and by preference, the main lever is formed of two parallel bars, from whose outer ends laterally project the knife edge bearings 6, which are upwardly directed, whereas the bearings 5 are downwardly directed.

The main lever 4 of the scale is provided with a counterbalance 7 connected thereto at the left-hand side (Fig. 2) of the bearings 5 and depending from such lever on that side of such axis or bearings. In addition, the main lever is provided with another counterbalance 8 which may be employed for fine adjustment of the scale so that its pointer, hereinafter referred to, may point to zero under normal conditions. This counterbalance 8 is adjustable with respect to the main lever 4 by screw threading upon a screw 9 projecting laterally from such main lever, as clearly indicated in Figs. 2 and 3.

The object of the bearings 6 of the main lever is to pivotally support the platform which, in the present instance, consists of a frame 10, arranged to support a pan or platform 11, which may be found convenient for receiving and holding the mail matter. This platform frame is provided with bearings 12 to coöperate with the knife edge bearings 6 and as shown in Figs. 1 and 3 such frame is provided with long depending and parallel arms 13, whose lower ends terminate near the base 1 of the scale, the resulting structure being a substantially inverted U-shaped frame with the platform proper supported at the upper end thereof.

Upon one of the standards or supports 2 is secured a scale 14, which is properly graduated, in the present instance, being graduated by sixteen divisions representing sixteen ounces, as shown in Fig. 3. With this scale coöperates the pointer or indicator 15, which is operatively connected with the lower ends of the depending arms 13. In the present instance, the pointer is connected with such depending arms by means of a yoke-shaped lever 16, the forks of which yoke are pivotally connected to the lower ends of the depending arms, while a laterally extending arm 16$^a$ is connected with the pointer near its lower end. The yoke is provided with an additional arm 16$^b$ parallel to the arm 16$^a$ and pivoted upon a rod or shaft 17 passing transversely through the front standard 2 and forming the fulcrum of the yoke and the axis of the pointer 15.

In the present instance, and by preference, the scale is provided with a dash pot 18 which, as shown, is arranged between the depending arms 13, with its piston rod 19 connected with such arms, in the present instance, to the cross bar 20 extending between the arms near their upper ends. As shown in Figs. 1 and 3 the base 1 of the scale may be provided with suitable means for leveling the scale, such as the adjusting screw 21.

The operation of the scale will be readily understood from the foregoing description and it will, therefore, suffice to say that, assuming that the weight 8 has been adjusted so as to cause the pointer 15 to indicate zero under normal conditions, the pointer will move or sweep over the scale or dial 14 to indicate the weight of the load on the platform, it being apparent from the construction shown and described that the scale will accurately indicate the weight, the pointer or indicator having a considerable sweep and the dial having rather wide graduations. Moreover, the weight can be very easily read by the operator and furthermore, by reason of the provision of the dash pot the delicate and accurate working of the parts of the scale cannot be interfered with by rough usage, as by suddenly throwing the load on and off the platform.

I claim:

1. The combination of a suitable support or frame-work, a lever pivotally mounted at the upper part thereof, a platform mounted upon said lever to one side of its pivot, load-counterbalancing means applied to said lever, arms depending from the platform on opposite sides of the lever, a yoke pivoted to the frame-work at the lower part thereof and having arms jointed respectively to those depending from the platform, a dash-pot cylinder between said yoke arms, and a piston rod connected to the platform arms.

2. The combination of a suitable support or frame-work, a lever pivotally mounted at the upper part thereof, a platform mounted upon said lever to one side of its pivot, a counterbalancing weight carried by said lever on the opposite side of its pivot, load counterbalancing means applied to said lever, arms depending from the platform on opposite sides of the lever, a yoke pivoted to the frame-work at the lower part thereof and having arms jointed respectively to those depending from the platform, a dial on the frame, and a pointer moving with the yoke and extending over said dial.

3. The combination of a suitable support or frame-work, a lever pivotally mounted at the upper part thereof, a platform mounted upon said lever to one side of its pivot, a counterbalancing weight carried by said lever on the opposite side of its pivot, a pendulum weight depending from the lever, arms depending from the platform on opposite sides of the lever, a yoke pivoted to the frame-work at the lower part thereof and having arms jointed respectively to those depending from the platform, a dial on the frame, and a pointer moving with the yoke and extending over said dial.

4. The combination of a suitable support or frame-work, a lever pivotally mounted at the upper part thereof, a platform mounted on said lever to one side of its pivot, a counter-balancing weight carried by said lever on the opposite side of its pivot, load counter-balancing means applied to said lever, an inverted U-shaped frame depending from said platform, a double yoke one pair of whose arms are jointed to the legs of the said U-shaped frame and the other pair of whose arms are pivoted to the lower part of the supporting frame-work, a dial on the latter, a pointer concentrically movable with said yoke, a dash-pot cylinder between the outer arms of the latter, and a piston rod connected to the inverted U-shaped platform frame.

5. In a scale, the combination of a main lever, a scale platform pivoted thereon and having a pair of depending arms, a pointer or indicator, operating connections between the pointer and the lower end of such arms, a cross bar 20 near the upper ends of such arms, and a dash pot operatively connected with such bar.

ALLEN DE VILBISS, Jr.

Witnesses:
S. E. HIBBEN,
LOUIS B. ERWIN.